United States Patent [19]

Quick

[11] 4,233,857
[45] Nov. 18, 1980

[54] MULTIPLE SPEED TRANSMISSION WITH AUXILIARY TRANSFER DRIVE

[75] Inventor: David C. Quick, New Berlin, Wis.

[73] Assignee: Allis-Chalmers Corporation, Milwaukee, Wis.

[21] Appl. No.: 911,779

[22] Filed: Jun. 2, 1978

[51] Int. Cl.³ .............................................. F16H 37/06
[52] U.S. Cl. ................................. 74/665 GA; 180/246
[58] Field of Search ............ 74/665 G, 665 A, 665 T; 180/44 R

[56] References Cited

U.S. PATENT DOCUMENTS

| | | |
|---|---|---|
| 2,158,320 | 5/1939 | Bock .............................. 74/665 G A |
| 2,431,727 | 12/1947 | Bennett ......................... 74/665 G A |
| 2,711,222 | 6/1955 | Bock .............................. 74/665 G A |
| 2,802,554 | 8/1957 | Pringle .......................... 74/665 G A |
| 2,805,586 | 9/1957 | Lucas ............................ 74/665 G A |
| 3,204,468 | 9/1965 | Ruoff ............................ 74/665 G A |
| 3,596,534 | 8/1971 | Logan . | |
| 3,763,947 | 10/1973 | Longshore . | |

*Primary Examiner*—Nile C. Byers, Jr.
*Attorney, Agent, or Firm*—Arthur L. Nelson

[57] ABSTRACT

A multiple speed countershaft transmission with a transfer gear drive driven by one of the countershaft gearsets having a gear on the output shaft driving at the output shaft speed to provide an auxiliary power takeoff from the transmission.

10 Claims, 4 Drawing Figures

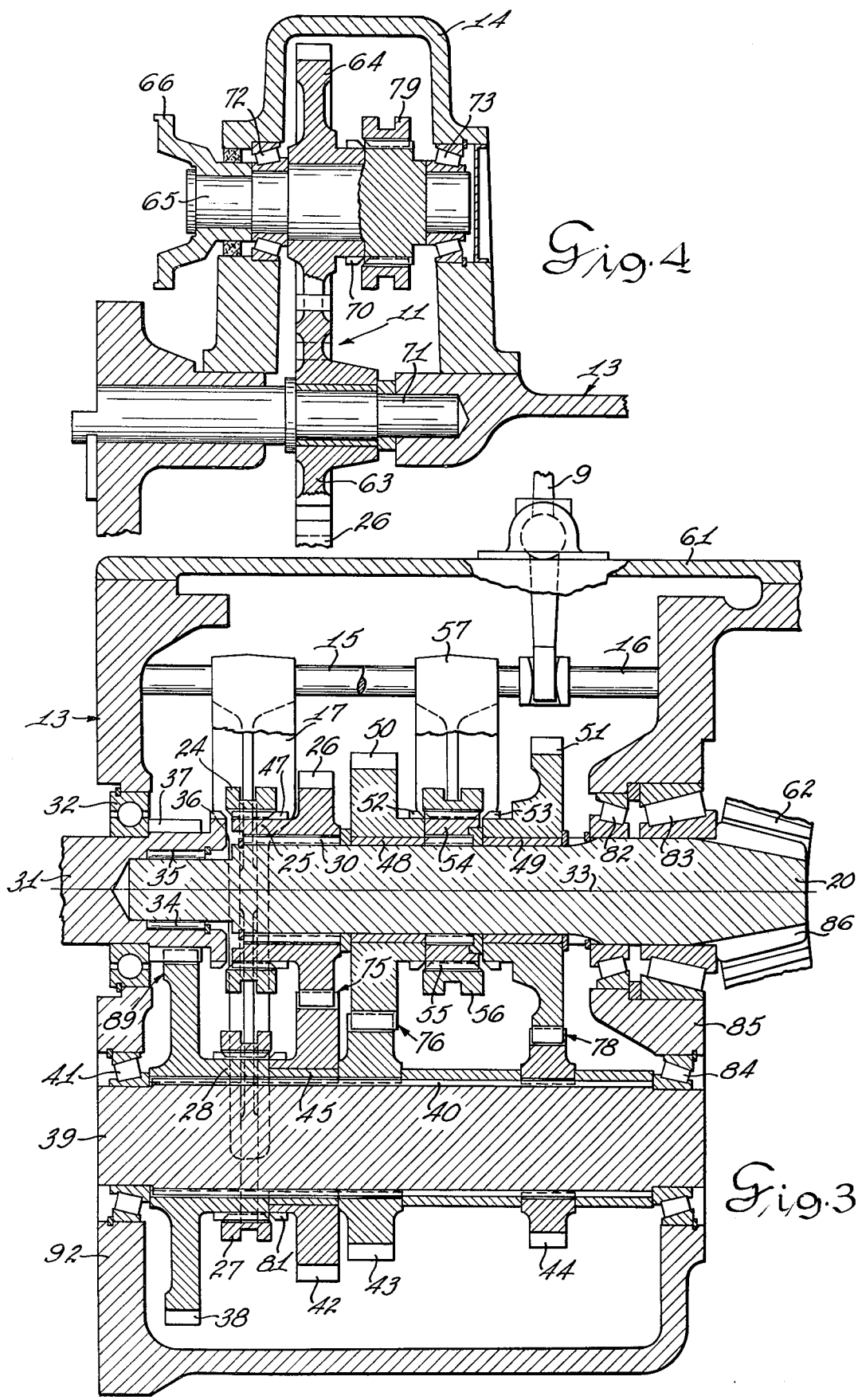

MULTIPLE SPEED TRANSMISSION WITH AUXILIARY TRANSFER DRIVE

This invention relates to a multiple speed countershaft transmission for a vehicle and more particularly to a power takeoff from the transmission through a transfer gearbox driven by a gear fastened to and rotating at the same speed as the output shaft. The gear on the output shaft forms a gearset with a gear on the countershaft with selective clutching on the countershaft.

The conventional tractor has an engine which drives through a transmission and a differential to drive the rear wheels on the tractor. Under most conditions the rear-wheel drive is satisfactory for providing the traction needed on the tractor. Under adverse conditions, however, it may be advantageous to provide a front-wheel assist on the tractor. The front-wheel assist can be operated through hydraulic means or mechanical means. A mechanical drive obviates the need for hydraulic conduits, couplings, motors and a large pump to provide the power transmission to the front wheels. Accordingly a mechanical drive of the front wheels can be provided through a power takeoff from the tractor transmission. This is normally done with the transfer gearbox on the transmission which receives the power from the transmission which is driving the rear wheels.

Accordingly this invention provides a cnvenient means through a transfer gearbox on the transmission of driving the front wheels. Since the transmission is a countershaft transmission, one of the gearsets between the countershaft and the output shaft can be used to provide the drive. The countershaft gearsets are normally clutched on the output shaft to provide the selected gear ratio and the power output to the output shaft which drives the differential. By providing a clutch on the countershaft instead of the output shaft and fixing a gear of one of the gearsets on the output shaft to run synchronously with the output shaft, this gear of the gearset provides a drive for the transfer gearbox. Selective clutching of this countershaft gearset is provided by a clutch on the countershaft which selectively engages and disengages the clutch for this gear ratio. The transfer gearbox is always in engagement. The transfer gearbox also includes a clutch for selectively engaging and disengaging the front wheel drive of the tractor through a separate clutching means. The gear fixed to the output shaft provides a dual function, one of a speed ratio in a countershaft general as well as an output drive for the front wheel drive of the tractor.

Accordingly, it is an object of this invention to provide selectively two-wheel drive and four-wheel drive on a vehicle.

It is another object of this invention to provide a multiple speed countershaft transmission with a shifter fork for selectively shifting a gear on the countershaft and a gear on the output shaft to selectively provide the desired gear ratio.

It is a further object of this invention to provide a countershaft transmission with a shifter fork operating two clutch collars with one of the clutches on the output shaft and the other clutch on the countershaft.

It is a further object of this invention to provide a vehicle countershaft transmission with a gear fixed to the output shaft for rotation at the same speed as the output shaft and a clutch on the countershaft of a countershaft gearset driving into the output shaft and power takeoff from the gear fixed to the output shaft driving into a transfer gearbox for selective driving of the front wheels of the vehicle.

The objects of this invention are accomplished through the use of a vehicle countershaft transmission with an input shaft and an output shaft rotating on a common axis. A countershaft is rotating on a axis parallel with the common axis and a countershaft gearset drives from the input shaft to the countershaft with return drive from the countershaft to the output shaft through a plurality of countershaft gearsets. Clutching is provided on the output shaft to selectively clutch the input shaft to output shaft for direct drive or clutches mounted on the output shaft for output through the countershaft for selected gear ratios. A gear of one of the gearsets between the countershaft and the output shaft is fixed to the output shaft with clutching means provided on the countershaft to selectively clutch on the countershaft. The gear fixed to the output shaft engages an auxiliary drive gear for providing front-wheel drive of the vehicle. A selective clutch is also provided for engaging and disengaging the drive for the front wheels. Accordingly, the gear fixed to the output shaft provides the dual function of a drive gear ratio for the main transmission and a power takeoff for auxiliary drive of the front wheels of the vehicle.

Referring to the drawings, the preferred embodiment of this invention is illustrated.

FIG. 3 is a cross-section view taken on line III—III of FIG. 2; and

FIG. 4 is a cross-section view of the transfer gearbox taken on line IV—IV of FIG. 2.

Figure 1:
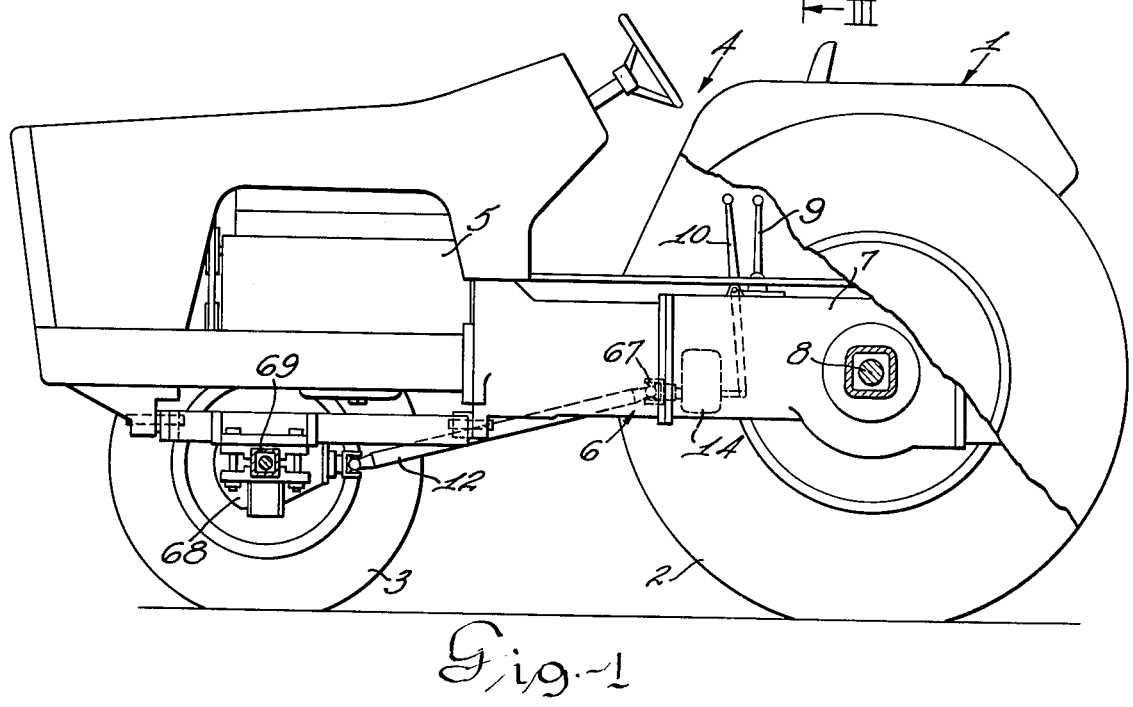
FIG. 1, is a side-elevation view partially in section of a tractor having front rear wheel drive.

FIG. 1 illustrates a side-elevation view of a tractor 1 mounted on the rear wheels 2 and front wheels 3. The tractor 1 defines an operator station 4. The engine 5 drives through the transmission 6, a differential, and a final drive assembly 7 drive the rear axles, of which rear axle 8 is shown. The transmission 6 is shifted by the shift lever 9 through selective gear ratios for driving the tractor. The front-wheel drive for the tractor is selectively engaged through the lever 10 which operates through the transfer geardrive 11 to drive through the propeller shaft 12 to drive the front wheels.

Figure 2:
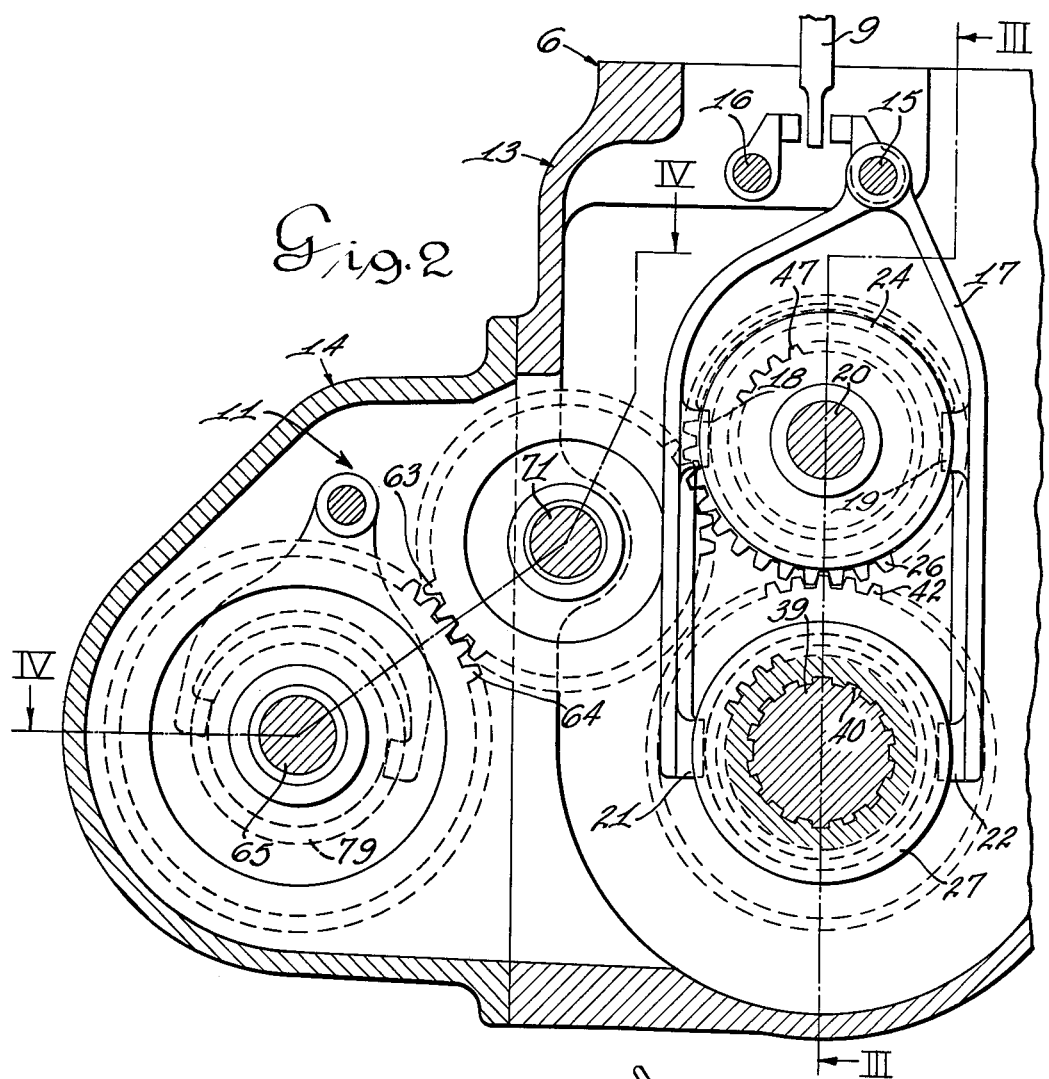
FIG. 2 is a cross-section view showing the transfer gearbox and the main transmission.

Referring to FIG. 2 the transmission housing 13 encloses the main transmission while the transfer gearcase 14 encloses the transfer geardrive for driving the front wheels of the tractor. The shift lever 9 selectively shifts one of the two shift rails 15 and 16 for shifting the vehicle transmission. The shift fork 17 with shoulders 18 and 19 is shown operating a clutch collar 24 on the output shaft 20 and clutch engaging shoulders 21 and 22 for shifting a clutch collar on the countershaft 39.

Referring to FIG. 3, the clutch collar 24 reciprocally slides on the clutch sleeve 25 carried on spline 30. Similarly the clutch collar 27 slides reciprocally of the clutch sleeve 28. The gear 26 is fixed to the output shaft by the spline 30. Accordingly, the gear 26 rotates at the same speed as the output shaft 20.

The transmission housing 13 is shown supporting the input shaft 31 and the output shaft 20. The bearing assembly 32 mounted in the housing 13 rotatably supports the input shaft 31 which is mounted for rotation about the common axis 33. The rear end of output shaft 20 and pinion 86 are rotatably mounted in bearings 82 and 83. The output shaft 20 is rotatably mounted in the needle bearing assembly 34 embraced within the central opening 35 of the input shaft 31. The input shaft 31 also forms clutch teeth 36 for clutching the input and output shafts for direct drive of the transmission. Input shaft 31 also forms a drive gear 37 which drives the driven gear 38 connected to the countershaft 39 by the spline 40. The countershaft 39 is rotatably mounted within the bearing assembly 41 of the side wall 92 and bearing 84 of side wall 85 of the transmission housing 13. The countershaft carries the gears 42, 43 and 44. The spline 40 of the countershaft 39 is received within mating splines of the gears 38, 43 and 44. Gears 43 and 44 provide return drive for the gearsets on the countershaft transmission. The sleeve 45 forms a bushing for the gear 42 which meshes with the gear 26. The gear 42 is permitted to rotate freely on the sleeve 45 normally unless the clutch sleeve 27 is engaged and then the gear 38 rotates with the gear 42.

The output shaft 20 carries bushings 48 and 49 for rotatably supporting the gears 50 and 51. The gear 50 is provided with clutch teeth 52 while gear 51 is provided with clutch teeth 53. The clutch sleeve 54 is splined to the output shaft 20. Similarly a splined external periphery 55 of sleeve 54 engages the internal spline of the clutch collar 56. The clutch collar 56 is selectively engaged by the shift fork 57 mounted on the shift rail 16. The clutch collar 56 is reciprocated on the clutch sleeve 54 by the shift fork 57 to selectively engage the gears 50 or 51 for drive through the output shaft 20. The shift fork 17 is mounted on the shift rail 15.

Accordingly, gears 50, 51 which are rotatably mounted on the output shaft 20 can be selectively clutched to the output shaft by the clutch collar 56. The gear 26, however, is connected through the spline 30 to the output shaft 20. The shift lever 9 is suitably mounted in the transmission cover 61 for shifting of the shift rails 15 and 16. The output shaft 20 drives through the differential 62 to drive the rear wheels.

The gear 26, however, being fixed to the output shaft 20 also drives gear 63 in the transfer gear case 14. Gear 63 drives gear 64 which is freely rotatable on shaft 65. Gear 64 drives the shaft 65 and the yoke 66 of the universal joint 67 when clutch collar 79 is engaged with gear 64. The universal joint 67 drives the propeller shaft 12 to drive the front wheels through a suitable differential 68 in the front axle 69 of the tractor. The lever 10 selectively operates the clutch collar 79 for engagement of the clutch teeth 70 on the gear 64. The clutch collar 79 is carried on the shaft 65 for selective engagement for front wheel drive from the transmission. The gear 63 is mounted on the shaft 71 of the transmission housing and is continually in engagement with the gear 26 to provide power takeoff for the front-wheel drive. The shaft 65 is rotatably mounted in the bearing assemblies 72 and 73 in the gear case 14.

The operation of the front wheel drive from the vehicle transmission 6 operates in the following manner. The input shaft 31 is driven by a suitable clutch from the engine 5. The clutch collar 24 selectively engages the clutch teeth 36 to provide direct drive to the output shaft 20. The clutch collar 24 can be reciprocally moved rearwardly on the spline 47 to the neutral position. Further rearward movement of shift fork 17 will engage gear 38 with gear 42 for drive through the countershaft gearset 75. The gearset 76 is engaged by the shift fork 57 as it is moved forwardly for the clutch collar 56 to engage the clutch teeth 52 of the gear 50.

Similarly the low speed ratio is engaged by engaging the clutch collar 56 with the clutch teeth 53 of gear 51 in which gearset 78 is engaged to drive from the countershaft 39 to the output shaft 20.

Drive from the input shaft 31 to the countershaft 39 is provided through the countershaft gearset 89 since the gear 38 is splined to the countershaft 39 and the gear 37 is integral with the input shaft 31. Selective clutching of the transmission is provided on the output shaft 20 through the clutch collars 24 and 56. The third speed ratio, however, is provided by the shift fork 17 through clutching of the clutch collar 27 to engage teeth 81 of the gear 42. This completes the drive from the countershaft 39 to the output shaft 20 since the gear 26 is splined to the output shaft 20.

The gear 26 is splined to the output shaft 20 and rotates at the same speed as the output shaft 20. The gear 26 is also constantly meshing with the idler gear 63 which in turn drives the front-wheel drive gear 64. The front-wheel drive gear 64 is clutched to the shaft 65 by the clutch collar 79 which selectively engages the clutch teeth 70 of the gear 64. This is selectively controlled through the manual clutch lever 10. The yoke 66 is fixed with shaft 65 for driving the propeller shaft 12 and the front wheel drive.

The gear 26 provides a dual function of a gear in the countershaft gearset 75 for drive through the transmission in the third speed ratio and also continuously driving the transfer gears 63 and 64. This provides a power takeoff from the transmission through the transfer gear case 14 for the front-wheel drive. The selective engagement of the front wheel drive is at the option of the driver by engaging the clutch collar 79 when desired.

The embodiments of the invention in which an exclusive property or privilege is claimed are defined as follows:

1. A vehicle transmission comprising, an input shaft and an output shaft rotating about a common axis, a countershaft rotating about a parallel axis, an input countershaft gearset connected between said input shaft and said countershaft for driving said countershaft, an output countershaft gearset connected between said countershaft and said output shaft for driving said output shaft device, a clutch for selectively and alternatively engaging a clutch on said output shaft and the countershaft with said output countershaft gearset, means connecting the output gear in said output countershaft gearset to said output shaft for rotating at the same speed as said output shaft, a transfer gear driven by said output gear of said output countershaft gearset for driving an auxiliary drive mechanism from said output gear.

2. A vehicle transmission as set forth in claim 1 including a plurality of gears rotatably mounted on said output shaft, a plurality of clutches on said output shaft for selectively engaging each of said gears on said output shaft for providing a selective gear ratio for driving from said transmission.

3. A vehicle transmission as set forth in claim 1 wherein said auxiliary drive mechanism defines a front-wheel drive system, a clutch on said front-wheel drive system for selectively driving front wheels of the vehicle from said output drive gear.

4. A vehicle transmission as set forth in claim 1, including a pinion gear mounted on said output shaft for driving a differential, said transfer gear driving a propeller shaft adapted for driving front wheels of said vehicle, a front-wheel clutch adapted for selectively engaging drive from said transmission to said front wheels.

5. The vehicle transmission as set forth in claim 1 wherein said clutch device includes a double shift fork for shifting a clutch on said countershaft and a clutch on said output shaft.

6. The vehicle transmission as set forth in claim 1 including a plurality of output countershaft gearsets between said countershaft and said output shaft, a plurality of clutches on said output shaft for selectively clutching to said output shaft, means fixing gears of said contershaft gearsets to said countershaft.

7. A vehicle transmission as set forth in claim 1 wherein said input shaft includes drive gear, a clutch teeth mounted on said input shaft, a clutch collar selectively connecting said clutch teeth on said output shaft with said drivegear of said input shaft for direct drive between said input and output shaft.

8. A vehicle transmission as set forth in claim 1 wherein said clutch device includes a shifter fork, a clutch collar slideably mounted on said output shaft for selectively engaging clutch teeth on said input shaft, a clutch collar on said countershaft for selectively clutching gear in said countershaft gearset on said countershaft, said shifter fork selectively engaging said clutch collar on said output shaft and said clutch collar on said countershaft for providing the selected gear ratios through said transmission.

9. The vehicle transmission as set forth in claim 1, including a plurality of clutches on said output shaft, a plurality of gears rotatably mounted on said output shaft for selective engagement through said clutches on said output shaft providing a selected gear ratio through said transmission, said clutch device includes a gear rotatably mounted on said countershaft, a clutch for selectively engaging said gear on said countershaft with said countershaft to provide a selected gear ratio through said transmission, a single shifter fork for selectively engaging one clutch on said output shaft and one clutch on said countershaft for selectively engaging the desired gear ratios through said transmission.

10. A vehicle transmission as set forth in claim 1 wherein said output gear includes a spline connection for connection to said output shaft, a clutch collar on said countershaft for selective engagement of said output countershaft gearset on said countershaft.

* * * * *

UNITED STATES PATENT OFFICE
CERTIFICATE OF CORRECTION

Patent No. 4,233,857          Dated November 18, 1980

Inventor(s) David E. Quick

It is certified that error appears in the above-identified patent and that said Letters Patent are hereby corrected as shown below:

Claim 7, line 2 - "a clutch" should have been ---clutch--- .

Signed and Sealed this

Fourth Day of August 1981

[SEAL]

Attest:

Attesting Officer

GERALD J. MOSSINGHOFF

Commissioner of Patents and Trademarks